United States Patent Office 3,717,665
Patented Feb. 20, 1973

3,717,665
SILOXANE-OXYALKYLENE COPOLYMERS
CONTAINING Si—Si BONDS
Ronald Sangster Stuart, Saltcoats, Scotland, assignor to Imperial Chemical Industries Limited, London, England
No Drawing. Filed Dec. 16, 1970, Ser. No. 98,903
Claims priority, application Great Britain, Jan. 5, 1970, 380/70
Int. Cl. C07b 7/10; C07f 7/08
U.S. Cl. 290—448.2 D
13 Claims

ABSTRACT OF THE DISCLOSURE

Siloxane-oxyalkylene copolymers having at least one polysiloxane block in which at least two silicon atoms are directly attached to each other and at least one polyoxyalkylene block in which there are at least two oxyalkylene units. The novel compounds are useful as surfactants in the preparation of polyurethane foams.

This invention relates to new and useful siloxane-oxyalkylene copolymers and to the use of such copolymers as surfactants in the preparation of polyurethane foams.

According to the present invention a new and useful siloxane-oxyalkylene copolymer comprises at least one polysiloxane block in which at least two silicon atoms are attached directly to each other and at least one polyoxyalkylene block comprising at least two oxyalkylene units attached to the said polysiloxane block.

The polysiloxane blocks may contain more than one ≡Si—Si≡ group. When two or more ≡Si—Si≡ groups are present they may be separated from each other by a single oxygen atom or by a siloxane group or block of the general formula $$O\left(\frac{R_bSiO_{\frac{4-b}{2}}}{}\right)_c$$

where R is a monovalent hydrocarbon group, hydrogen or a polyoxyalkylene group, $b$ is 0, 1 or 2 and $c$ is a positive integer. The groups R when monovalent hydrocarbon groups may be alkyl, aryl, aralkyl, alkaryl, alkenyl or cycloalkenyl groups. Suitable groups include, for example, methyl, ethyl, propyl, butyl, decyl, phenyl, naphthyl, benzyl, 2-phenylethyl, tolyl, vinyl, allyl and cyclohexyl groups.

Preferably the polysiloxane blocks contain units of the formula $R_2SiO$ and are terminated by $R_3SiO_{1/2}$ units, R being preferably a methyl group or hydrogen. Preferred units are $Me_2SiO$ and $MeHSiO$ for the chain and $Me_3SiO_{1/2}$ and $Me_2HSiO_{1/2}$ for the ends. There may also be present, if desired, minor amounts of $RSiO_{3/2}$, $HSiO_{3/2}$ and $SiO_2$ units.

The polyoxyalkylene blocks comprise at least 2 and up to, for example, 100 oxyalkylene units ($C_dH_{2d}O$) where $d$ is 2, 3 or 4, not all of which need be alike in any one block. These are attached to a polysiloxane block by a Si—X—C linkage where X is O or R'O, R' being an organic group having a valency of 2, 3 or 4 and preferably of valency 2. One valency of the group R' is satisfied by silicon and the remainder by oxygen atoms attached to polyoxyalkylene blocks. Groups suitable for this purpose include, for example, divalent groups containing carbon and hydrogen only, such as 1,3 - propylene, 1,11-undecylene,

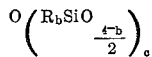

—CH₂CHCH₂—     —CH₂CH₂CH—
     |         |
     CH₃       C₂H₅

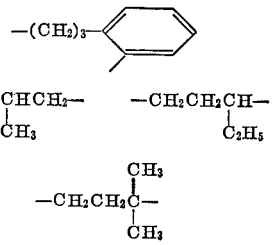

divalent groups containing carbon, hydrogen and oxygen such as

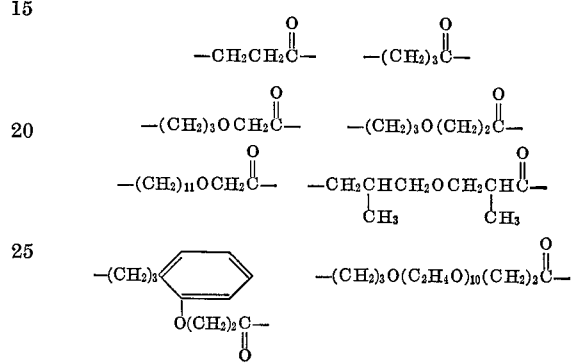

divalent groups containing carbon, hydrogen, oxygen and nitrogen such as

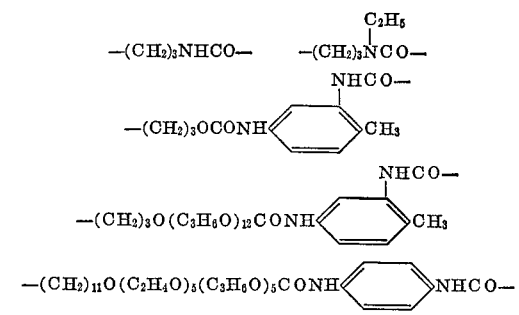

trivalent groups containing carbon and hydrogen such as

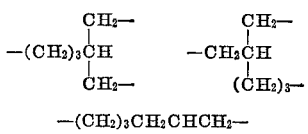

—(CH₂)₃CH₂CHCH₂— trivalent groups containing carbon, hydrogen and oxygen such as

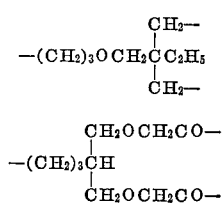

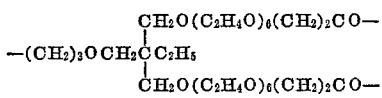

trivalent groups containing carbon, hydrogen, oxygen and nitrogen such as

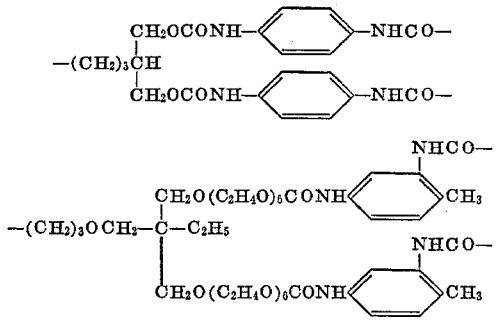

and tetravalent groups such as

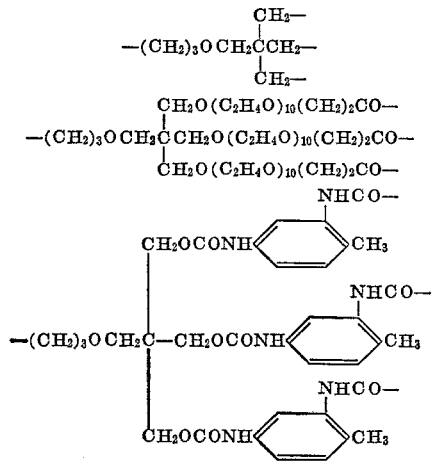

It is frequently preferred that the groups R' be of the general formula —(CH$_2$)$_s$—, —(CH$_2$)$_s$CO— or

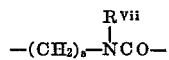

where $s$ is an integer from 2 to 10 but is preferably 3 and R$^{vii}$ is hydrogen or a monovalent hydrocarbon group having 1 to 6 carbon atoms.

The polyoxyalkylene blocks are preferably formed of oxyethylene units either alone or together with oxy-1,2-propylene units.

The silicon atoms to which the polyoxyalkylene blocks are joined may be, for example, in a ≡Si—Si≡ unit, a unit of the type

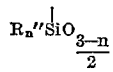

or of the type

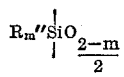

where R" is a monovalent hydrocarbon group, $n$ is 0, 1 or 2 and $m$ is 0 or 1. In the latter type of unit there are two polyoxyalkylene blocks bonded to the same silicon atom.

Suitable polysiloxane precursors containing reactive groups by means of which polyoxyalkylene blocks may be attached, may be prepared in a variety of ways. Thus, for example, one or more disilanes having hydrolysable groups and polyether reactive groups, i.e. groups capable of reaction with suitable polyether reactants such as polyethers containing hydroxyl, vinyl or substituted vinyl groups which may be the same or different, may be hydrolysed alone. Alternatively, one or more hydrolysable disilanes, optionally also containing polyether reactive groups, may be cohydrolysed with one or more hydrolysable silanes of the general formula

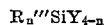

where R''' is a monovalent hydrocarbon group or a polyether reactive group, Y is a hydrolysable group which may also be a polyether reactive group, and $n$ is 1, 2 or 3. It will, of course, be understood that when the polyether reactive groups are hydrolysable groups, the hydrolysis or cohydrolysis is only partial, leaving an average of at least 1 polyether reactive group per molecule in the hydrolysate. Another suitable method for the preparation of polysiloxane precursors is by the reaction of one or more halogenodisilanes of the general formula

where R$^{iv}$ is a monovalent hydrocarbon group, X' is a halogen and $r$ is an integer from 1 to 5 inclusive, with one or more polysiloxanes in presence of a suitable catalyst, for example, such as ferric chloride or a quaternary ammonium halide. The organopolysiloxanes are preferably cyclic compounds of the general formula (R$^v_2$SiO)$_p$ where R$^v$ is a monovalent hydrocarbon group, preferably a methyl group, or hydrogen, not more than one hydrogen atom being attached to any one silicon atom, and $p$ is an integer preferably from 3 to 6 inclusive. The products have terminal halogen atoms which may be hydrolysed or used as polyether reactive groups. Partial hydrolysis or cohydrolysis of the halodisilanes with suitable hydrolysable silanes or siloxanes may be carried out before such reaction with organopolysiloxanes. The halosiloxane reaction product may also be hydrolysed or cohydrolysed with suitable hydrolysable silanes or siloxanes, it being understood that sufficient halogen atoms are retained after hydrolysis to provide on average at least one per molecule in the polysiloxane precursor.

The polysiloxane precursor thus contains at least one unit of one or more of the types

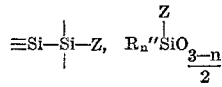

or

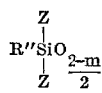

where Z is a polyether reactive group which may be, for example, a halogen atom such as chlorine or bromine, an alkoxy, aroxy or acyloxy group or hydrogen and R", $m$ and $n$ are as hereinbefore defined.

These precursors may be reacted with a hydroxylated polyoxyalkylene compound to form an ≡Si—O—C≡ linkage between the siloxane and polyoxyalkylene blocks with elimination of HZ. The preferred type of hydroxylated polyoxyalkylene compound is a polyoxyalkylene mono-ol of the general formula R$^{vi}$(OC$_d$H$_{2d}$)$_x$OH, where R$^{vi}$ is a monofunctional group selected from monovalent hydrocarbon groups, acyl groups and substituted carbamyl groups having one or two hydrocarbon groups on the nitrogen atom, and $z$ is an integer from 2 to 100 inclusive.

Copolymers in which the polyoxyalkylene blocks are attached to the polysiloxane blocks by ≡Si—R'O—C≡ linkages may be produced by reacting a polysiloxane precursor containing the necessary ≡Si—Si≡ group and having at least one Si—H group with a polyoxyalkylene reactant containing the group CH$_2$=C< such that addition of Si—H thereto gives the group Si—R'. Alternatively, the siloxane precursor may be reacted with an unsaturated reactant containing the group CH$_2$=C< and may contain 1, 2 or 3, but preferably contains only 1, polyether reactive group, for example an ester or isocyanate group or a halogen. In this case it is subsequently reacted with one or more polyoxyalkylene mono-ols of formula $R^{vi}(OC_dH_{2d})_zOH$ or with a suitable derivative thereof, for example an alkali metal salt thereof, for example when reaction is to be with a halogen-containing reactant. It is, however, in general preferred that the unsaturated reactant already has present the polyoxyalkylene group.

One preferred class of the copolymers of our invention in which the polyoxyalkylene blocks are attached to polysiloxane blocks by $\equiv$Si—O—C$\equiv$ linkages consists of a polysiloxane block with polyoxyalkylene blocks attached to terminal silicon atoms and has in the molecule a single $\equiv$Si—Si$\equiv$ bond. This class may be represented by the following general formula:

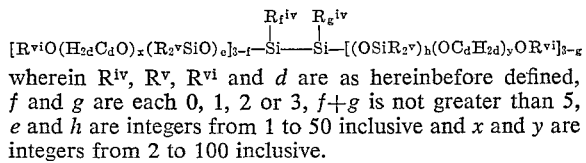

wherein $R^{iv}$, $R^v$, $R^{vi}$ and $d$ are as hereinbefore defined, $f$ and $g$ are each 0, 1, 2 or 3, $f+g$ is not greater than 5, $e$ and $h$ are integers from 1 to 50 inclusive and $x$ and $y$ are integers from 2 to 100 inclusive.

Copolymers of this class may be prepared by first reacting one or more suitable chloro-containing disilanes, for example, of general formula

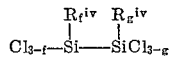

with one or more cyclic organopolysiloxanes of formula $(R_2^v SiO)_p$ in presence of a suitable catalyst to form a mixture of chloropolysiloxanes (I). The mixture of chloropolysiloxanes (I) so formed is then reacted with one or more polyether mono-ols of formula $R^{vi}(OC_dH_{2d})_zOH$ in presence of a suitable hydrogen chloride acceptor.

A second preferred class of the copolymers of our invention in which the polyoxyalkylene blocks are attached to polysiloxane blocks by $\equiv$Si—O—C$\equiv$ linkages may be prepared by partial hydrolysis of one or more organochlorodisilanes followed by reaction with one or more cyclic organopolysiloxanes to give a mixture of chloropolysiloxanes (II) having two or more $\equiv$Si—Si$\equiv$ links in the molecule, which is then reacted with one or more polyether mono-ols $R^{vi}(OC_dH_{2d})_zOH$ to yield a mixture of copolymers having two or more $\equiv$Si—Si$\equiv$ linkages joined together by oxygen atoms thus

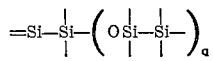

where $q$ is an integer.

A third preferred class may be prepared by partial hydrolysis of the chloropolysiloxanes (I) obtained by reaction of one or more organochlorodisilanes

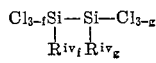

with one or more cyclic organopolysiloxanes and reaction of the product with the polyether mono-ol

The groups $R^v$ in the above formulae as stated when not hydrogen are monovalent hydrocarbon groups and may be, for example, methyl, ethyl, n-propyl, isopropyl, n-butyl or higher alkyl groups, cyclohexyl, phenyl, tolyl, benzyl or phenylethyl groups. In many cases methyl groups are particularly preferred.

The groups $R^{vi}$ in the above formulae are preferably monovalent hydrocarbon groups, for example methyl, ethyl, n-propyl, isopropyl, n-butyl, isobutyl, tert.-butyl, isooctyl, cyclohexyl, phenyl, tolyl, naphthyl or benzyl groups.

Further cross-linking can be introduced into the products of our invention by reaction of the chlorosiloxanes prepared by any of the methods described above with one or more polyoxyalkylene mono-ols $R^{vi}(OC_dH_{2d})_zOH$ together with a minor amount of one or more diols and/or polyols. The diols and polyols used for this purpose may be simple or polyoxyalkylene diols and polyols.

Diols and polyols which may be used to produce cross-linking include ethylene glycol, hexane diol, diethylene glycol, glycerol, trimethylolpropane, pentaerythritol and polyoxyalkylene diols and polyols containing two or more units of the formula $(C_dH_{2d}O)$. These diols and polyols may be prepared by the reaction of simple diols and polyols with ethylene, propylene or butylene oxides.

Suitable catalysts for the reaction of chlorodisilanes or their partial hydrolysates with cyclic organopolysiloxanes include ferric chloride and quaternary ammonium halides. The reaction is carried out at elevated temperatures, for example at from 50 to 250° C. and preferably from 100 to 200° C. It is also normally carried out in the absence of solvent.

Suitable HCl acceptors for the condensation of chloropolysiloxanes with polyoxyalkylene mono-ols and with diols and polyols include tertiary amines such as pyridine, N,N-diethylaniline and triethylamine.

Preferred Si—H containing polysiloxane precursors suitable for the preparation of copolymers having $$\equiv SiR'OC\equiv$$

linkages between the polysiloxane and polyoxyalkylene blocks may be prepared, for example, by equilibrating one or more chlorodisilanes of formula

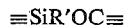

with one or more cyclic organopolysiloxanes $(R_2^v SiO)_p$, a sufficient number of the $R^v$ groups being hydrogen so that the product contains an average of at least one hydrogen atom per molecule, in presence of a suitable catalyst such as ferric chloride. This gives a product

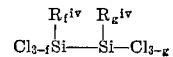

(V)

which may then be end-topped with $R_3^v SiO_{1/2}$ units. This can be achieved by reaction of (V) with excess $R_3^v SiCl$ in presence of water, followed by removal of the by-product $R_3^v SiOSiR_3^v$ formed. Alternatively, the terminal chlorine atoms may be reduced in known manner, for example using $LiAlH_4$.

Si—H containing siloxanes of higher molecular weight containing two or more $\equiv$Si—Si$\equiv$ groups may be obtained by partial hydrolysis of the chlorine atoms of (V) before or after the equilibration stage, the product being end-stopped as before prior to further reaction.

The Si—H addition reaction is carried out in known manner, for example, by reacting in presence of a catalyst. Suitable catalysts include, for example, metallic platinum and organic solvent soluble compounds or complexes of platinum such as chloroplatinic acid, olefin/platinous chloride complexes such as, for example, cyclohexene/platinous chloride complex, platinum alcoholates such as the reaction product of chloroplatinic acid and 2-ethylhexanol, other soluble platinum complexes such as dichloro-bis(diethylsulphide) platinum II. Compounds and complexes of other metals well known as catalysts for Si—H addition reactions such as, for example, dicobaltoctacarbonyl may also be used. The reaction is also in general preferably carried out at an elevated temperature and in presence of a suitable solvent, for example, such as a liquid hydrocarbon or ether.

In using the products of our invention in polyurethane foam manufacture the known techniques may be followed. Thus the process may be one-stage or two-stage. Our products are, however, specially valuable as foam stabilising agents in the one-stage process for the preparation of foams from polyethers in which a major proportion of the hydroxyl end groups are secondary hydroxyl groups.

Our invention is further illustrated by the following examples in which all parts are by weight.

EXAMPLE 1

180 parts of octamethylcyclotetrasiloxane and 2 parts of ferric chloride were added to 20 parts of a mixture of methyl(chloro)disilanes having the average composition $Si_2(CH_3)_{2.3}Cl_{3.7}$. The mixture was stirred and heated for 2 hours at 120° C. and then for a further 3 hours at 145° C. After cooling to 20° C. the mixture was filtered to give 198 parts of a mixture of (ω-chloropolydimethylsiloxy) disilanes of average composition $$Si_2(CH_3)_{2.3}\{[OSi(CH_3)_2]_{8.3}Cl\}_{3.7}$$

which was a clear, colourless, mobile liquid. In a gasometric estimation of the Si—Si bond using ethanol and potassium hydroxide, over 90 percent of the theoretical amount of hydrogen was evolved.

60.4 parts of polyoxyalkylated cyclohexanol of average formula $H(OC_2H_4)_{17.6}(OC_3H_6)_{13.4}OC_6H_{11}$ were dissolved in 190 parts of benzene and the solution dried by removal of the water as an azeotrope with return of solvent to the solution for one hour. The solution was then cooled to 20° C. and 5.48 parts of N,N-diethylaniline added. 20 parts of the mixture of (ω-chloropolydimethylsiloxy)disilanes prepared as described, dissolved in 90 parts of dry benzene, were added to the stirred solution at this temperature over a period of 20 minutes, after which the solution was heated under reflux for 2 hours. After cooling to 20° C. the precipitated N,N-diethylaniline hydrochloride was removed by filtration. The filtrate was thereafter stripped of solvent, final traces being removed under vacuum at 100° C. to leave 75 parts of a clear, pale, straw coloured liquid of viscosity 990 cs. at 25° C.

EXAMPLE 2

535.9 parts of hexamethylcyclotrisiloxane and 6 parts of tricapryl(methyl)ammonium chloride were added to 59.5 parts of a mixture of methyl(chloro)disilanes of the average composition $Si_2(CH_3)_{2.3}Cl_{3.7}$. The mixture was heated to 145–150° C. for three hours whilst stirring continuously, cooled to 20° C. and filtered. There were thus obtained 590 parts of a mixture of (ω-chloropolydimethylsiloxy)disilanes of the average composition $Si_2(CH_3)_{2.3}\{[OSi(CH_3)_2]_8Cl\}_{3.7}$ which was a clear, colourless, mobile liquid.

633.4 parts of polyoxyalkylated n-butanol of the average formula $H(OC_2H_4)_{19.1}(OC_3H_6)_{14.5}OC_4H_9$ were dissolved in 1750 parts of toluene and the solution dried by azeotropic distillation, with return of solvent to the mixture, for 30 minutes. The solution was thereafter cooled to 20° C. and 29.1 parts of pyridine added. Whilst stirring at this temperature, a solution of 200 parts of the mixture of the (ω-chloropolydimethylsiloxy)disilanes, prepared as described, in 850 parts of toluene was added gradually over a period of 30 minutes. The mixture was thereafter heated under reflux for 2 hours, allowed to cool to 20° C. and filtered to remove precipitated pyridine hydrochloride. The filtrate was stripped of solvent, final traces being removed under vacuum at 100° C., to leave 780 parts of a clear, light straw coloured viscous liquid.

EXAMPLE 3

900 parts of hexamethylcyclotrisiloxane and 10 parts of ferric chloride were added to 100 parts of a mixture of methyl(chloro)disilanes of the average composition $Si_2(CH_3)_{2.3}Cl_{3.7}$. The mixture was stirred and heated for 6 hours at 140–145° C., cooled to 20° C. and filtered. There were thus obtained 996 parts of a mixture of (ω-chloropolydimethylsiloxy)disilanes of the average composition $Si_2(CH_3)_{2.3}\{[OSi(CH_3)_2]_{7.3}Cl\}_{3.7}$ which was a clear, colourless, mobile liquid.

652 parts of polyoxyalkylated phenol of the average formula $H(OC_2H_4)_{18.9}(OC_3H_6)_{14.3}OC_6H_5$ were dissolved in 1750 parts of toluene and the solution dried by azeotropic distillation, with return of solvent to the mixture, for 1 hour. The solution was thereafter cooled to 20° C. and 29.1 parts of pyridine added. Whilst stirring at this temperature a solution of 200 parts of the mixture of (ω-chloropolydimethylsiloxy)disilanes, prepared as described, in 850 parts of toluene was added gradually over a period of 20 minutes. The mixture was thereafter stirred and heated under reflux for 2 hours, cooled to 20° C. and filtered to remove percipitated pyridine hydrochloride. The filtrate was stripped of solvent, final traces being removed under vacuum at 100° C., to give 800 parts of a clear, pale straw coloured liquid of viscosity 573 cs. at 25° C.

EXAMPLE 4

60 parts of octamethylcyclotetrasiloxane and 2 parts of ferric chloride were added to 20 parts of a mixture of methyl(chloro)disilanes of the average composition $$Si_2(CH_3)_{2.3}Cl_{3.7}$$

The mixture was heated to 145° C. whilst stirring for 3 hours, cooled to 20° C. and filtered. There were thus obtained 78 parts of a mixture of (ω-chloropolydimethylsiloxy)disilanes of the average composition $$Si_2(CH_3)_{2.3}\{[OSi(CH_3)_2]_{2.4}Cl\}_{3.7}$$

which was clear, colourless, mobile liquid.

50.6 parts of oxyethylated ethylene glycol monomethyl ether of average molecular weight 550 were dissolved in 180 parts of toluene and traces of water removed by azeotropic distillation, with return of solvent to the mixture, for 1 hour. The solution was thereafter cooled to 20° C. and 7.3 parts of pyridine added. Whilst stirring at this temperature a solution of 20 parts of the mixture of (ω-chloropolydimethylsiloxy)disilanes, prepared as described, in 85 parts of toluene was added gradually over a period of 20 minutes. The mixture was thereafter stirred and heated under reflux for 2 hours, cooled to 20° C. and filtered to remove precipitated pyridine hydrochloride. The filtrate was stripped of solvent, final traces being removed at 100° C. under vacuum, to give 63 parts of a clear, pale straw coloured liquid.

EXAMPLE 5

1.8 parts of water were added to a solution of 44.4 parts of a mixture of methyl(chloro)disilanes of the average composition $Si_2(CH_3)_{2.3}Cl_{3.7}$ in 88 parts of toluene, and the mixture stirred vigorously for 2 hours at 20–25° C. 249.1 parts of octamethylcyclotetrasiloxane were then added to the solution and the toluene removed from the solution by distillation through an efficient Vigreaux column until the reflux temperature at the head of the column reached 115° C. at atmospheric pressure. 3 parts of ferric chloride were added to the residue and the mixture heated to 140–145° C. whilst stirring for 7 hours, cooled to 20° C. and filtered to give 285 parts of a clear, colourless, mobile liquid.

86.5 parts of polyoxyalkylated cyclohexanol of the average formula $H(OC_2H_4)_{17}(OC_3H_6)_{13}OC_6H_{11}$ were dissolved in 210 parts of toluene and the solution dried by azeotropic distillation, with return of the solvent to the mixture, for 30 minutes. The solution was thereafter cooled to 20° C. and 4.43 parts of pyridine added. Whilst stirring at this temperature a solution of 28.8 parts of the mixture of chloro(polydimethylsiloxy)disilanes, prepared as described above, in 55 parts of toluene was added over a period of 20 minutes. The mixture was thereafter stirred and heated under reflux for 2.5 hours, cooled to 20° C. and filtered to remove precipitated pyridine hydrochloride. The filtrate was stripped of solvent, final traces being removed under vacuum at 100° C., to give 100 parts of a clear, pale straw coloured liquid of viscosity 862 cs. at 25° C.

EXAMPLE 6

0.15 part of water was added to a solution of 37.3 parts of the mixture of (ω-chloropolydimethylsiloxy) disilanes of the average composition $$Si_2(CH_3)_{2.3}\{[OSi(CH_3)_2]_{7.3}Cl\}_{3.7}$$

prepared as described in Example 1, in 85 parts of toluene and the mixture stirred vigorously for 2.5 hours at 20° C., after which it was heated under reflux for 15 minutes. The solution was then cooled to 20° C. and was added over a period of 20 minutes at this temperature to a solution of 70.7 parts of polyoxyalkylated cyclohexanol of the average formula $H(OC_2H_4)_{17}(OC_3H_6)_{13}OC_6H_{11}$ and 3.63 parts of pyridine in 85 parts of toluene which had previously been dried by azeotropic distillation, with return of solvent to the mixture. The mixture was thereafter stirred and heated under reflux for 1.5 hours, cooled to 20° C. and filtered to remove precipitated pyridine hydrochloride. The filtrate was stripped of solvent, final traces being removed at 100° C. under vacuum, to give 89 parts of a clear, pale straw coloured liquid of viscosity 1785 cs. at 25° C.

EXAMPLE 7

A solution of 30 parts of polyoxypropylated glycerol of average molecular weight 3000, and 2.4 parts of pyridine in 85 parts of toluene was added with continuous stirring over a period of 10 minutes at 20° C. to a solution of 66.6 parts of the mixture of (ω-chloropolydimethylsiloxy)disilanes of average composition $$Si_2(CH_3)_{2.3}\{[OSi(CH_3)_2]_{7.3}Cl\}_{3.7}$$

of Example 3 in 170 parts of toluene. The mixture was stirred for 30 minutes at 20° C. and then heated under reflux for 15 minutes. The solution was cooled to 20° C. and over a period of 20 minutes there was added at this temperature whilst stirring a solution of 132.2 parts of polyoxyalkylated cyclohexanol of the average formula $H(OC_2H_4)_{17}(OC_3H_6)_{13}OC_6H_{11}$ in 175 parts of toluene which had been dried previously by azeotropic distillation, and which contained 6.5 parts of pyridine. The mixture was thereafter stirred and heated under reflux for 2 hours, cooled to 20° C. and filtered to remove precipitated pyridine hydrochloride. The filtrate was stripped of solvent, final traces being removed at 100° C. under vacuum, to give 192.5 parts of a clear, straw coloured liquid of viscosity 527 cs. at 25° C.

EXAMPLE 8

360 parts of 1,3,5,7 - tetramethylcyclotetrasiloxane $(CH_3SiHO)_4$, 2100 parts of octamethylcyclotetrasiloxane and 26.8 parts of ferric chloride were added to 222 parts of a mixture of methyl(chloro)disilane having the average composition $Si_2(CH_3)_{2.3}Cl_{3.7}$. The mixture was stirred and heated to a temperature of 140–147° C. for 4½ hours. After cooling to 20° C. the ferric chloride was removed by filtration, leaving a clear, colourless oil having the average formula $$(CH_3)_{2.3}Si-Si[(OSiHCH_3)_{1.62}(OSi(CH_3)_2)_{7.65}Cl]_{3.7}$$

The filtrate was dissolved in 8000 parts of diethyl ether. 1085 parts of trimethylchlorosilane were added to the solution so obtained and, whilst stirring vigorously, 1800 parts of water were added at such a rate that the mixture refluxed gently during the addition. After completion of the addition of water, the mixture was stirred for 1 hour, during which time the temperature fell to 20° C., and thereafter 250 parts of sodium chloride were added. The sodium chloride dissolved in the aqueous layer. The aqueous layer was separated and the ether solution washed five times with 2000 parts of a 20 percent aqueous sodium chloride solution and then once with 2000 parts of water. It was then dried over anhydrous sodium sulphate for 18 hours and after filtering off the sodium sulphate, the solvent and hexamethyldisiloxane were removed by distillation at 100° C. and 2 mm. pressure of mercury to leave 2010 parts of a clear, colourless oil having the average formula $$(CH_3)_{2.3}Si-Si[(OSi[H]CH_3)_{1.62}$$
$$(OSi[CH_3]_2)_{7.65}OSi(CH_3)_3]_{3.7}$$

Analysis by bromination showed that the product contained the correct amounts of Si—H and Si—Si groups.

A solution of 1050 parts of the allyloxyacetate of polyoxyalkylated cyclohexanol of average formula $$CH_2=CH.CH_2OCH_2COO(C_3H_6O)_{14.5}(C_2H_4O)_{19.1}C_6H_{11}$$

in 300 parts of toluene was dried by azeotropic distillation with return of solvent to the mixture and cooled to 25° C. 254 parts of the oil prepared as described above and a solution of 0.121 part of bis(diethylsulphide) platinous chloride in 20 parts of toluene were then added thereto. Whilst stirring the mixture in an atmosphere of nitrogen, its temperature was raised to 85° C. over a period of 30 minutes, after which it was maintained in the range 85–89° C. for 5½ hours. The solution was then cooled to 25° C., filtered and the solvent removed by distillation at 100° C. and 2 mm. pressure of mercury to leave 1200 parts of a clear, light brown oil of viscosity 1459 cs. at 25° C., having the average composition $$(CH_3)_{2.3}Si-Si[(OSi(R)CH_3)_{1.62}$$
$$(OSi(CH_3)_2)_{7.65}OSi(CH_3)_3]_{3.7}$$

wherein $$R=(CH_2)_3OCH_2COO(C_3H_6O)_{14.5}(C_2H_4O)_{19.7}C_6H_{11}$$

EXAMPLE 9

1800 parts of octamethylcyclotetrasiloxane and 20 parts of ferric chloride were added to 222 parts of a mixture of methyl(chloro)disilane having the average composition $Si_2(CH_3)_{2.3}Cl_{3.7}$. The mixture was stirred and heated to 145–148° C. for 7 hours. After cooling to 20° C. the ferric chloride was removed by filtration, leaving a clear, colourless oil having the average formula $$(CH_3)_{2.3}Si-Si[(OSi(CH_3)_2)_{5.95}Cl]_{3.7}$$

A mixture of 1011 parts of the oil prepared in this way and 945 parts of dimethylmonochlorosilane were dissolved in 2000 parts of diethyl ether and whilst stirring 900 parts of water were added to the mixture at such a rate that with ice/water cooling of the reaction vessel, the temperature of the reaction mixture was maintained in the range 25–30° C. during the hydrolysis process. After completion of the addition of the water, the mixture was stirred for a further period of 2 hours at 20° C. and maintained at that temperature for 16 hours. The ether layer was then separated, washed 5 times with 1000 parts of 20 percent sodium chloride solution and dried for 24 hours over anhydrous sodium sulphate. After filtering off the sodium sulphate, the bulk of the ether and 1,1,2,2-tetramethyldisiloxane were removed by distillation at atmospheric pressure and final traces of volatile material were subsequently removed by distillation up to a pot temperature of 100° C. at 0.5 mm. Hg pressure, to leave a clear, colourless oil of the average formula $$(CH_3)_{2.3}Si-Si[(OSi(CH_3)_2)_{5.95}OSi(CH_3)_2H]_{3.7}$$

A solution of 177.6 parts of undecylenate of polyoxyalkylated cyclohexanol of the average formula $$CH_2=CH(CH_2)_8COO(C_3H_6O)_{13}(C_2H_4O)_{17}C_6H_{11}$$

in 200 parts of toluene was dried by azeotropic distillation with return of solvent to the mixture and cooled to 25° C. 58 parts of the oil prepared as described above and a solution of 0.023 part of bis(diethylsulphide)platinous chloride in 5 parts of toluene were then added thereto. Whilst stirring in an atmosphere of nitrogen the temperature of the mixture was increased to 110° C. over a period of 30 minutes, after which it was maintained in the range of 110–115° C. for 6 hours. The solvent was then removed by distillation at 100° C. and 2 mm. Hg pressure to leave 230 parts of a clear, light brown oil of viscosity 1536 cs. at 25° C. having the average composition

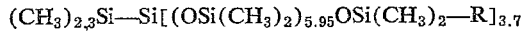
$(CH_3)_{2.3}Si—Si[(OSi(CH_3)_2)_{5.95}OSi(CH_3)_2—R]_{3.7}$ where $R=(CH_2)_{10}COO(C_3H_6O)_{13}(C_2H_4O)_{13}C_6H_{11}$.

EXAMPLE 10

100 parts of oxypropylated glycerol of molecular weight 3000, 49.7 parts of a 80:20 mixture of 2,4- and 2,6-tolylendi-isocyanate, 4 parts of water, 0.3 part of stannous octoate, 0.08 part of triethylenediamine and 1.0 part of the product of Example 1 were mixed together. There was thus obtained a resilient polyurethane foam of fine, even cell structure and density 1.7 lb./cu. ft.

Similar foams were produced when the products of Examples 2, 3 and 5 to 9 were used in place of the product of Example 1 in the above process.

EXAMPLE 11

100 parts of oxypropylated trimethylolpropane of average molecular weight 315, 145 parts of crude 4,4′-di-isocyanatodiphenylmethane, 25 parts of trichlorofluoromethane, 0.2 part of dibutyltin dilaurate, 15 parts of tri-beta-chloroethylphosphate, 1.0 part of N,N-dimethylcyclohexylamine and 1.0 part of the product of Example 4 were mixed together. There was thus obtained a rigid polyurethane foam of fine, uniform cell structure and density 2.8 lb./cu. ft.

What I claim is:

1. Siloxane-oxyalkylene copolymers comprising at least one polysiloxane block in which at least two silicon atoms are attached directly to each other and which contains units of the general formula $R_2SiO$, the group R being selected from the group consisting of alkyl, aryl, and polyoxyalkylene groups and at least one polyoxyalkylene block comprising at least two and up to 100 oxalkylene units of the general formula $(C_dH_{2d}O)$ where $d$ is 2, 3 or 4, attached to the said polysiloxane block.

2. Copolymers according to claim 1 wherein the polysiloxane block contains two or more ≡Si—Si≡ groups separated from each other by a siloxane group of the general formula

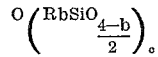
$O\left(\dfrac{R_bSiO_{4-b}}{2}\right)_c$ where $b$ is 0, 1 or 2 and $c$ is a positive integer.

3. Copolymers according to claim 1 wherein the polyoxyalkylene blocks are attached to polysiloxane blocks by C—O—Si linkages.

4. Copolymers according to claim 1 wherein the polyoxyalkylene blocks are attached to polysiloxane blocks by a C—OR′—Si linkage where R′ is an organic group of valency 2 selected from the group consisting of groups of the general formula $—(CH_2)_s—$, $—(CH_2)_sCO—$ or

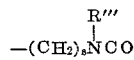
$$—(CH_2)_s\overset{R'''}{\underset{|}{N}}CO$$

where $s$ is an integer from 2 to 10 and R′′′ is hydrogen or a monovalent hydrocarbon group having from 1 to 6 carbon atoms.

5. Copolymers according to claim 4 wherein $s$ is 3.

6. Copolymers according to claim 1 wherein there is in the molecule a single ≡Si—Si≡ bond and one or more polyoxyalkylene blocks are attached to terminal silicon atoms.

7. Copolymers according to claim 6 having the general formula

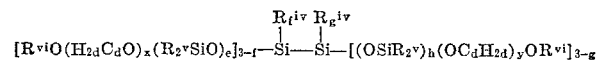
$$[R^{vi}O(H_{2d}C_dO)_x(R_2^vSiO)_e]_{3-f}—\underset{R_f^{iv}}{\underset{|}{Si}}—\underset{R_g^{iv}}{\underset{|}{Si}}—[(OSiR_2^v)_h(OC_dH_{2d})_yOR^{vi}]_{3-g}$$

where $R^{iv}$ and $R^v$ are selected from the group consisting of alkyl and aryl groups, $R^{vi}$ is selected from the group consisting of alkyl, aryl and cycloalkyl groups, $d$ is 2, 3 or 4, $e$ and $h$ are positive integers not greater than 50, $f$ and $g$ are 0, 1, 2 or 3, $f+g$ being not greater than 5 and $x$ and $y$ are integers from 2 to 100 inclusive.

8. Copolymers according to claim 1 wherein the polyoxyalkylene blocks are formed from oxyethylene units either alone or together with oxy-1,2-propylene units.

9. A process for the production of a siloxane-oxyalkylene copolymer comprising hydrolysing one or more hydrolysable disilanes containing a polyether reactive group either alone or with one or more hydrolysable silanes of the general formula

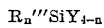
$$R_n'''SiY_{4-n}$$

where R′′′ is hydrogen or a monovalent hydrocarbon group having from 1–6 carbon atoms, Y is a hydrolysable group which may also be a polyether reactive group and $n$ is 1, 2 or 3, and reacting the hydrolysis product so obtained with a polyoxyalkylene mono-ol of the general formula $R^{vi}(OC_dH_{2d})_zOH$ where $R^{vi}$ is selected from the group consisting of alkyl, aryl and cycloalkyl groups, and $z$ is an integer from 2 to 100.

10. A process for the production of a siloxane-oxyalkylene coplymer comprising reacting one or more halogenosilanes of the general formula $(R^{iv}_rSi_2X'_{6-r})$ where $R^{iv}$ is selected from the group consisting of alkyl and aryl groups, X′ is a halogen and $r$ is an integer from 1 to 5 inclusive, with or without a first step of partial hydrolysis with one or more hydrolysable silanes or siloxanes, with one or more organopolysiloxanes of the general formula $(R^v_2SiO)_p$ where $R^v$ is selected from the group consisting of alkyl and aryl groups and $p$ is an integer from 3 to 6 inclusive, and the product thereafter reacted with a polyoxyalkylene mono-ol of the general formula $$R^{vi}(OC_dH_{2d})_zOH$$

where $R^{vi}$ is selected from the group consisting of alkyl, aryl and cycloalkyl and $z$ is an integer from 2 to 100.

11. A process according to claim 10 wherein the halosiloxanes reaction product is partially hydrolysed or cohydrolysed before reaction with the polyoxyalkylene mono-ol.

12. A process according to claim 10 wherein $R^v$ is selected from the group consisting of methyl groups and hydrogen.

13. A process for the production of a siloxane-oxyalkylene copolymer comprising first reacting one or more chlorodisilanes of the general formula

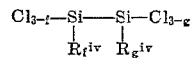
$$Cl_{3-f}—\underset{R_f^{iv}}{\underset{|}{Si}}—\underset{R_g^{iv}}{\underset{|}{Si}}—Cl_{3-g}$$

where $R^{iv}$ is selected from the group consisting of alkyl and aryl groups, $f$ and $g$ are each 0, 1, 2 or 3 and $f+g$ is not greater than 5, with one or more cyclic organopolysiloxanes of the general formula $(R^v_2SiO)_p$ where $R^v$ is selected from the group consisting of alkyl and aryl groups and $p$ is an integer from 3 to 6 inclusive, and thereafter reacting the product with a polyoxyalkylene mono-ol of the general formula $R^{vi}(OC_dH_{2d})_zOH$ where $R^{vi}$ is selected from the group consisting of alkyl, aryl and cycloalkyl groups and $z$ is an integer from 2 to 100 inclusive with or without a minor amount of a reactant selected from the group consisting of diols and polyols.

References Cited

UNITED STATES PATENTS 3,122,522  2/1964  Brown et al. ___ 260—448.2 D X
3,381,019  4/1968  Morehouse ___ 260—448.2 D X DANIEL E. WYMAN, Primary Examiner
P. F. SHAVER, Assistant Examiner U.S. Cl. X.R.

260—2.5 AM, 46.5 P, 448.8 R